(12) United States Patent
Yin et al.

(10) Patent No.: US 10,830,146 B2
(45) Date of Patent: Nov. 10, 2020

(54) COMPRESSOR BLEED COOLING SYSTEM FOR MID-FRAME TORQUE DISCS DOWNSTREAM FROM A COMPRESSOR ASSEMBLY IN A GAS TURBINE ENGINE

(71) Applicant: Siemens Aktiengesellschaft, Munich (DE)

(72) Inventors: Yan Yin, Oviedo, FL (US); Robert W. Sunshine, Hobe Sound, FL (US); Kok-Mun Tham, Oviedo, FL (US); Todd A. Ebert, West Palm Beach, FL (US); Kevin M. Light, Maitland, FL (US); Ernie B. Campbell, Orlando, FL (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 112 days.

(21) Appl. No.: 16/070,070

(22) PCT Filed: Mar. 1, 2016

(86) PCT No.: PCT/US2016/020186
§ 371 (c)(1),
(2) Date: Jul. 13, 2018

(87) PCT Pub. No.: WO2017/151110
PCT Pub. Date: Sep. 8, 2017

(65) Prior Publication Data
US 2019/0010871 A1    Jan. 10, 2019

(51) Int. Cl.
*F01D 5/08* (2006.01)
*F02C 7/18* (2006.01)
(Continued)

(52) U.S. Cl.
CPC ............ *F02C 7/18* (2013.01); *F01D 5/081* (2013.01); *F01D 5/084* (2013.01); *F01D 5/085* (2013.01);
(Continued)

(58) Field of Classification Search
CPC .......... F01D 5/081; F01D 5/082; F01D 25/12; F04D 29/582
See application file for complete search history.

(56) References Cited

U.S. PATENT DOCUMENTS

| 5,558,496 A | 9/1996 | Woodmansee et al. |
| 5,735,671 A * | 4/1998 | Brauer ............... F01D 5/081 416/95 |

(Continued)

FOREIGN PATENT DOCUMENTS

| CN | 101915165 A | 12/2010 |
| CN | 104515146 A | 4/2015 |

(Continued)

OTHER PUBLICATIONS

PCT International Search Report and Written Opinion dated Nov. 15, 2016 corresponding to PCT Application No. PCT/US2016/020186 filed Mar. 1, 2016.

*Primary Examiner* — Ninh H. Nguyen

(57) ABSTRACT

A cooling system configured to cool aspects of the turbine engine between a compressor and a turbine assembly is disclosed. In at least one embodiment, the cooling system may include one or more mid-frame cooling channels extending from an inlet through one or more mid-frame torque discs positioned downstream of the compressor and upstream of the turbine assembly. The inlet may be positioned to receive compressor bleed air. The mid-frame cooling channel may be positioned in a radially outer portion of the mid-frame torque disc to provide cooling to outer aspects of the mid-frame torque disc such that conventional, (Continued)

low cost materials may be used to form the mid-frame torque disc rather than high cost materials with capacity to withstand higher temperatures. The cooling fluid routed through the mid-frame cooling channel in the mid-frame torque disc may be exhausted into a cooling system (10) for the downstream turbine assembly.

17 Claims, 4 Drawing Sheets

(51) Int. Cl.
*F01D 25/12* (2006.01)
*F04D 29/58* (2006.01)
*F02C 7/12* (2006.01)
*F01D 17/10* (2006.01)

(52) U.S. Cl.
CPC ........... *F01D 25/12* (2013.01); *F04D 29/582* (2013.01); *F01D 5/082* (2013.01); *F01D 17/105* (2013.01); *F02C 7/12* (2013.01); *F05D 2220/32* (2013.01); *F05D 2250/231* (2013.01); *F05D 2260/22141* (2013.01)

(56) References Cited

U.S. PATENT DOCUMENTS

| | | | |
|---|---|---|---|
| 7,585,148 B2* | 9/2009 | Hoell | F01D 5/026 |
| | | | 415/115 |
| 8,801,366 B2* | 8/2014 | Dueckershoff | F01D 5/187 |
| | | | 415/115 |
| 10,450,864 B2* | 10/2019 | Kim | F01D 5/08 |
| 2007/0271930 A1 | 11/2007 | Takaoka et al. | |
| 2010/0104418 A1 | 4/2010 | Weidmann et al. | |
| 2014/0311157 A1 | 10/2014 | Laurello et al. | |
| 2017/0081962 A1* | 3/2017 | Kim | F01D 5/187 |
| 2017/0107822 A1* | 4/2017 | Kim | F04D 29/582 |
| 2017/0152747 A1* | 6/2017 | Kim | F01D 5/081 |

FOREIGN PATENT DOCUMENTS

| | | | |
|---|---|---|---|
| CN | 104564185 A | 4/2015 | |
| DE | 102010035393 A1 | 3/2012 | |
| EP | 1006261 A2 | 6/2000 | |
| EP | 1775420 A2 * | 4/2007 | ............... B22C 9/04 |
| JP | H09195702 A | 7/1997 | |
| JP | 2007298020 A | 11/2007 | |
| WO | 2008045054 A1 | 4/2008 | |
| WO | 2014197474 A1 | 12/2014 | |

* cited by examiner

COMPRESSOR BLEED COOLING SYSTEM FOR MID-FRAME TORQUE DISCS DOWNSTREAM FROM A COMPRESSOR ASSEMBLY IN A GAS TURBINE ENGINE

FIELD OF THE INVENTION

This invention is directed generally to turbine engines, and more particularly to cooling fluid feed systems with cooling air for turbine airfoils in gas turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies to these high temperatures. As a result, turbine blades and turbine vanes must be made of materials capable of withstanding such high temperatures. Turbine blades, vanes and other components often contain cooling systems for prolonging the life of these items and reducing the likelihood of failure as a result of excessive temperatures.

While conventional cooling systems within the turbine engines cool aspects of the turbine engine, including the compressor and turbine assemblies, mid-frame torque discs positioned between the compressor and turbine assemblies still face cooling challenges. One solution has been to form the mid-frame torque discs from more expensive materials that have a higher heat tolerance than conventional lower cost materials. However, even with such high cost materials, the mid-frame torque discs can suffer from high levels of creep.

SUMMARY OF THE INVENTION

A cooling system configured to cool aspects of the turbine engine between a compressor and a turbine assembly is disclosed. In at least one embodiment, the cooling system may include one or more mid-frame cooling channels extending from an inlet through one or more mid-frame torque discs positioned downstream of the compressor and upstream of the turbine assembly. The inlet may be positioned to receive compressor bleed air. The mid-frame cooling channel may be positioned in a radially outer portion of the mid-frame torque disc to provide cooling to outer aspects of the mid-frame torque disc such that conventional, low cost materials may be used to form the mid-frame torque disc rather than high cost materials with capacity to withstand higher temperatures. The cooling fluid routed through the mid-frame cooling channel in the mid-frame torque disc may be exhausted into a cooling system for the downstream turbine assembly.

In at least one embodiment, the cooling system for a turbine engine may include a compressor formed from a plurality of stages positioned within a compressor chamber wherein each of the plurality of stages may include a set of radially extending compressor blades. The cooling system may also include one or more mid-frame cooling channels extending from an inlet through at least one mid-frame torque disc positioned downstream of the compressor and upstream of a turbine assembly. The mid-frame cooling channel may extend through an outer portion of one or more mid-frame torque discs. In particular, the mid-frame cooling channel may extend axially through the mid-frame torque disc within a radially outwardmost 50 percent of the at least one mid-frame torque disc. In at least one embodiment, the mid-frame cooling channel may extend axially through the mid-frame torque disc within a radially outwardmost 25 percent of the mid-frame torque disc. In yet another embodiment, the mid-frame torque disc may be formed from a torque disc rim positioned radially outward of a torque disc hub, whereby the outer and inner disc bodies are separated by a torque disc web having an axially extending width that is less than both the torque disc rim and the torque disc hub and the mid-frame cooling channel is positioned in the torque disc rim.

The cooling system may also include one or more cooling fluid supply bleed circuits with a bleed inlet placing the cooling fluid bleed circuit in fluid communication with the compressor chamber for receiving fluid from the compressor chamber, whereby the inlet of the mid-frame cooling channel is in fluid communication with the cooling fluid supply bleed circuit. The mid-frame cooling channel may extend from inlet into at least one compressor disc positioned upstream of the mid-frame torque disc. The cooling system may also include one or more inlet sections in communication with the inlet and immediately downstream from the inlet, wherein the inlet section is nonparallel and nonorthogonal to a longitudinal axis of the turbine engine to create de-swirling action for minimum pressure drop.

In at least one embodiment, the mid-frame cooling channel may include a plurality of axially extending mid-frame channels extending axially through the mid-frame torque disc. The adjacent axially mid-frame extending channels may be positioned equidistant from each other and adjacent axially mid-frame extending channels may be positioned an equal distance in a radially outward direction from a longitudinal axis of the turbine engine. The mid-frame cooling channel may extend from the mid-frame torque disc into at least one turbine disc positioned downstream of the mid-frame torque disc. The mid-frame cooling channel may include one or more outlets in the turbine assembly. In at least one embodiment, the mid-frame cooling channel may be formed from a cylindrical tube.

The cooling system may also include one or more outlet sections in communication with an outlet of the cooling system, whereby the outlet section is position immediately upstream from the outlet and the outlet section is nonparallel and nonorthogonal to a longitudinal axis of the turbine engine. The cooling system may also include one or more thermal barrier coatings on a radially outer surface of the mid-frame torque disc and aligned radially outward from the mid-frame cooling channel.

An advantage of the cooling system is that the cooling system may provide cooling to outer aspects of the mid-frame torque disc such that conventional, low cost materials may be used to form the mid-frame torque discs rather than high cost materials with capacity to withstand higher temperatures, thereby resulting in significant cost savings.

Another advantage of the cooling system is that the cooling system operates with compressor bleed air, thereby eliminating any need for alternative cooling air fluid sources, which improves efficiency of the turbine engine.

Yet another advantage of the cooling system is that the cooling system may reduce stresses resulting in increased fracture life in torque discs.

Another advantage of the cooling system is that the cooling system creates reduced blade tip clearances in compressor and turbine discs.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
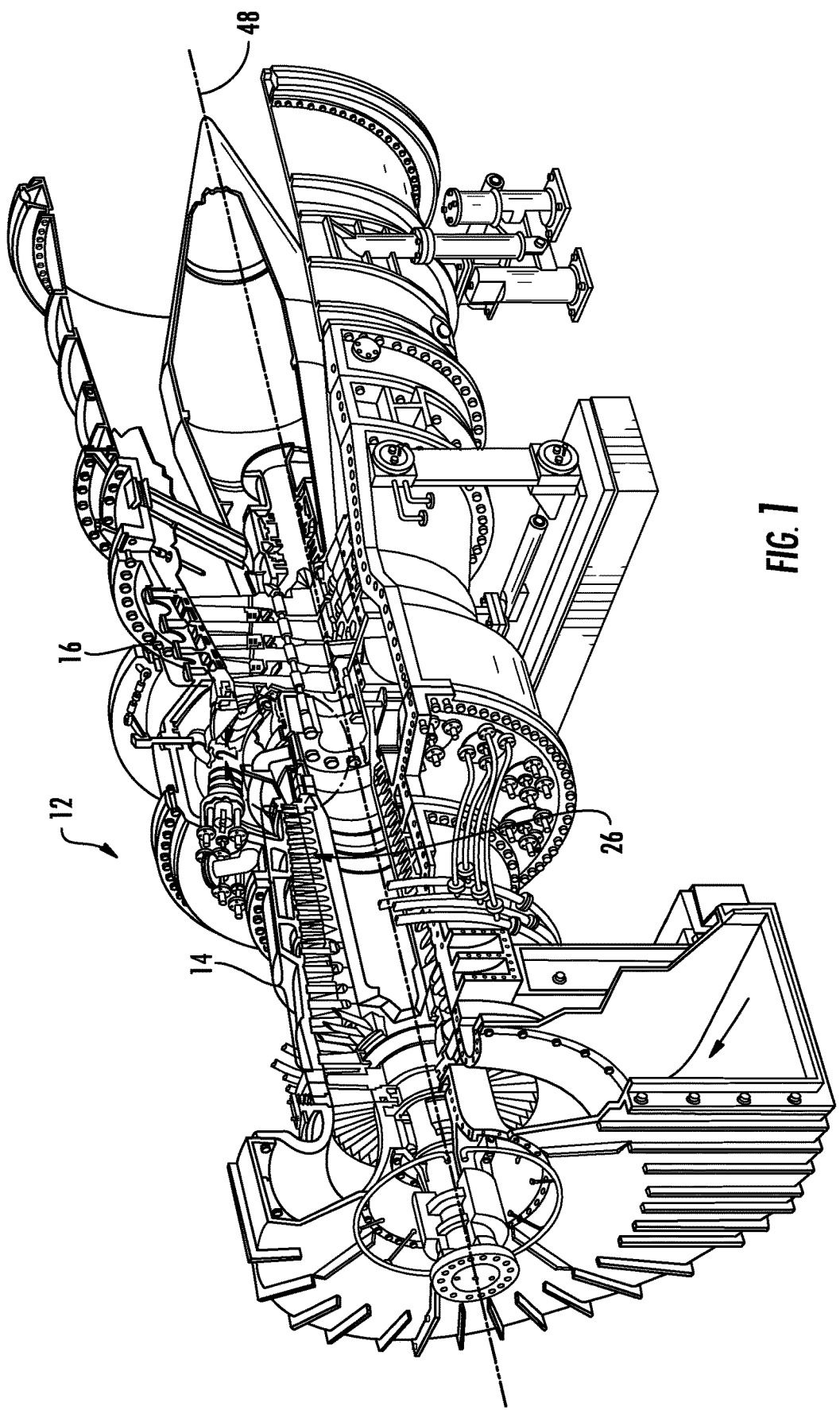
FIG. 1 is a partial cross-sectional perspective view of a turbine engine with a cooling system for one or more mid-frame torque discs and other turbine engine components.

As shown in FIGS. 1-7, a cooling system 10 configured to cool aspects of the turbine engine 12 between a compressor 14 and a turbine assembly 16 is disclosed. In at least one embodiment, the cooling system 10 may include one or more mid-frame cooling channels 18 extending from an inlet 20 through one or more mid-frame torque discs 22 positioned downstream of the compressor 14 and upstream of the turbine assembly 16. The inlet 20 may be positioned to receive compressor bleed air. The mid-frame cooling channel 18 may be positioned in a radially outer portion of the mid-frame torque disc 22 to provide cooling to outer aspects of the mid-frame torque disc 22 such that conventional, low cost materials may be used to form the mid-frame torque disc 22 rather than high cost materials with capacity to withstand higher temperatures. The cooling fluid routed through the mid-frame cooling channel 18 in the mid-frame torque disc 22 may be exhausted into a cooling system 10 for the downstream turbine assembly 16.

In at least one embodiment, the cooling system 10 for a turbine engine 12 may include a compressor 14, as shown in FIG. 1, formed form a plurality of stages 26 positioned within a compressor chamber 28. Each of the plurality of stages 26 may include a set of radially extending compressor blades 29. The stages 26 may have any appropriate configuration either already invented or yet to be conceived configuration.

Figure 2:
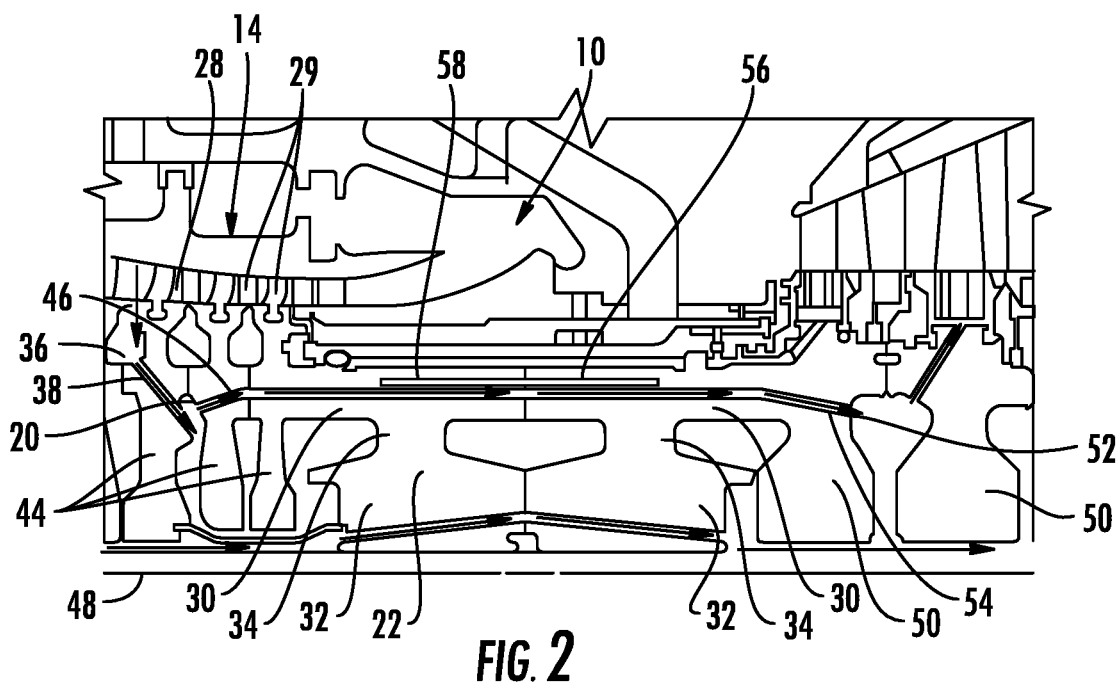
FIG. 2 is a partial cross-sectional side detail view of a portion of the turbine engine with the cooling system with an inlet section downstream of the inlet taken at detail line 2-2 in FIG. 1.
Figure 3:
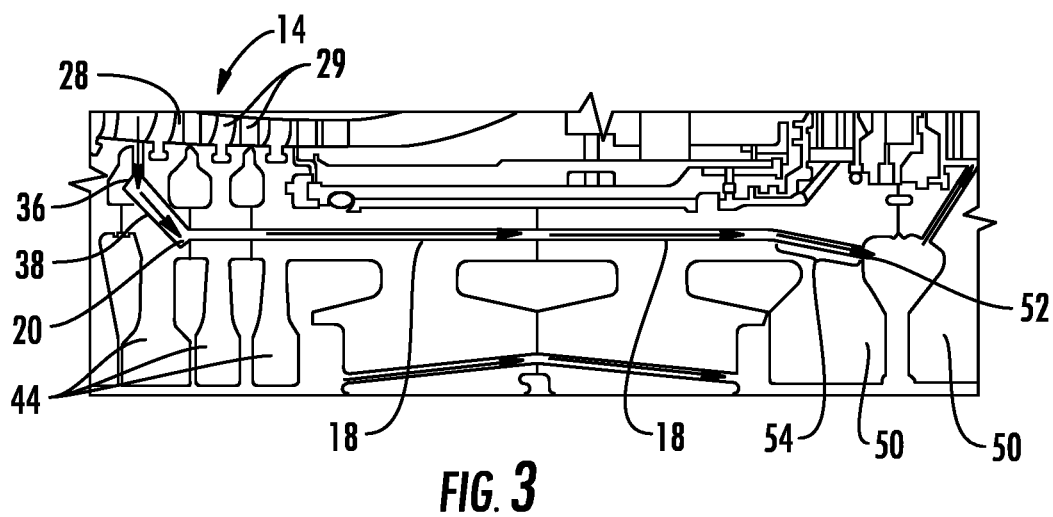
FIG. 3 is a partial cross-sectional side detail view of a portion of the turbine engine with the cooling system with an inlet section downstream of the inlet taken at detail line 2-2 in FIG. 1.
Figure 4:
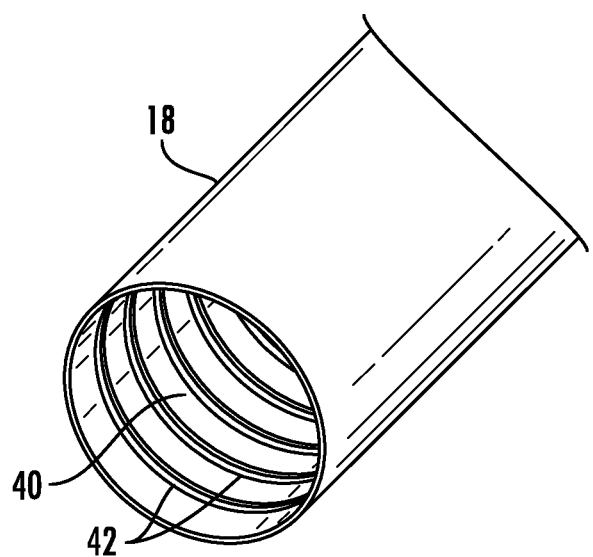
FIG. 4 is a partial perspective view of a mid-frame cooling channel with ribs on the inner surface.
Figure 5:
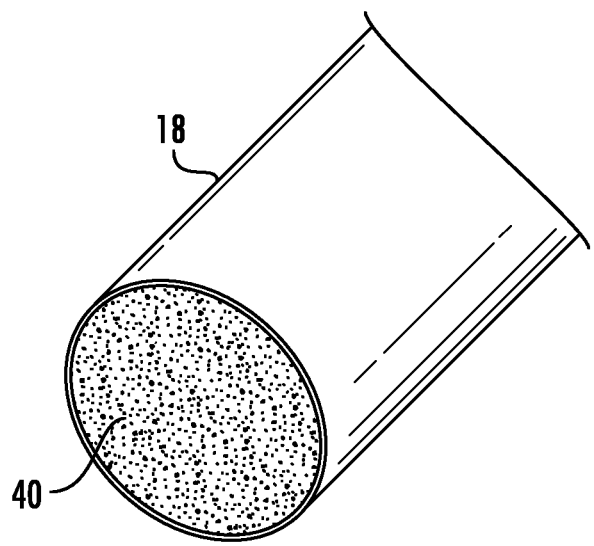
FIG. 5 is a partial perspective view of a mid-frame cooling channel with a roughened inner surface.
Figure 6:
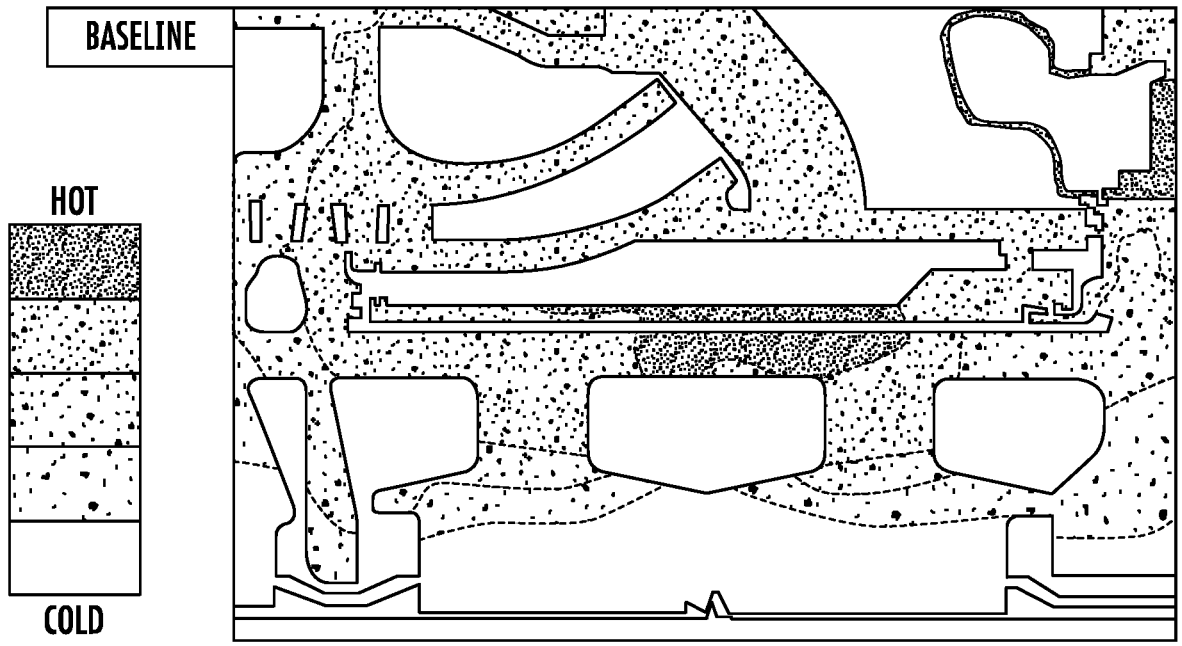
FIG. 6 is a screenshot of output from prediction software of the material temperature within a turbine engine at steady state operating conditions without the cooling system, showing the large temperature gradient within the mid-frame torque discs and high temperatures in the mid-frame torque discs.

The cooling system 10, as shown in FIGS. 2 and 3, may include one or more mid-frame cooling channels 18 extending from an inlet 20 through one or more mid-frame torque discs 22 positioned downstream of the compressor 14 and upstream of a turbine assembly 16. The mid-frame cooling channel 18 may have any appropriate configuration. In at least one embodiment, the mid-frame cooling channel 18 may be formed from a cylindrical tube. The cylindrical tube may be formed from a drilled hole in the mid-frame torque disc 22. In at least one embodiment, the cooling system 10 may include a plurality of mid-frame cooling channels 18 through one or more mid-frame torque discs 22. The cooling system 10 may include any appropriate combination of count and size of mid-frame cooling channels 18 to provide necessary cooling to the mid-frame torque discs 22 while satisfying rotor integrity. In at least one embodiment, the cooling system 10 may include twenty mid-frame cooling channels 18. In another embodiment, the cooling system 10 may include fifty mid-frame cooling channels 18. In yet another embodiment, the cooling system 10 may include seventy one mid-frame cooling channels 18. The cooling system 10 may include cooling channels 18 numbering between twenty and one hundred. In at least one embodiment, the adjacent axially mid-frame extending channels 18 may be positioned an equal distance in a radially outward direction from a longitudinal axis 48 of the turbine engine 12. Alternatively, two or more of the axially mid-frame extending channels 18 may be positioned at different distances extending radially outward from the longitudinal axis 48 of the turbine engine 12. One or more, or all, of the adjacent axially mid-frame extending channels 18 may be positioned equidistant from each other. In other embodiments, one or more, or all, of the adjacent axially mid-frame extending channels 18 may be positioned at alternating distances, random distances, or different distances from each other. One or more of the mid-frame cooling channels 18 may have modified inner surfaces 40 to enhance heat transfer, as shown in FIGS. 4 and 5. In particular, internal surfaces 40 of the mid-frame cooling channels 18 may include heat transfer enhancement features, such as, but not limited to, ribs 42, as shown in FIG. 4, forming a ribbed surface and a highly roughened surface, as shown in FIG. 5.

In at least one embodiment, the mid-frame cooling channel 18 may be positioned in an outer portion of the mid-frame torque disc 22. In particular, the mid-frame cooling channel 18 may extend axially through the mid-frame torque disc 22 within a radially outwardmost 50 percent of the mid-frame torque disc 22. In another embodiment, the mid-frame cooling channel 18 may extend axially through the mid-frame torque disc 22 within a radially outwardmost 25 percent of the mid-frame torque disc 22. In yet another embodiment, the mid-frame torque disc 22 may be formed from an torque disc rim 30 positioned radially outward of a torque disc hub 32. The outer and inner disc bodies 30, 32 may be separated by a torque disc web 34 having an axially extending width that is less than a width of each of the torque disc rim 30 and the torque disc hub 32. The mid-frame cooling channel 18 may be positioned in the torque disc rim 30. The torque disc rim 30 may form an outer 25 percent of a radially extending length of the mid-frame torque disc 22.

In at least one embodiment, the cooling system 10 may include one or more cooling fluid supply bleed circuits 38. The cooling fluid supply bleed circuit 38 may supply cooling fluid to the cooling system 10. In other embodiments, the cooling system 10 may receive cooling fluid as bleed air directly from the compressor chamber 28 of the compressor 14. The cooling fluid supply bleed circuit 38 may include a bleed inlet 36 that may place the cooling fluid supply bleed circuit 38 in fluid communication with the compressor chamber 28 for receiving fluid from the compressor chamber 28. In at least one embodiment, the inlet 20 of the mid-frame cooling channel 18 may be in fluid communication with the cooling fluid supply bleed circuit 38. In other embodiments, the inlet 20 of the mid-frame cooling channel 18 may be in fluid communication with the compressor chamber 28 of the compressor 14 to receive compressor bleed fluid, such as, but not limited to, air. The mid-frame cooling channel 18 may extend from the inlet 20 into one or more compressor discs 44 positioned upstream of the mid-frame torque disc 22. The cooling system 10 may also include an inlet section 46 in communication with the inlet 20 and immediately downstream from the inlet 20. The inlet section 46 may be nonparallel and nonorthogonal to a longitudinal axis 48 of the turbine engine 12. The inlet section 46 may be misaligned against the rotating direction of the compressor blades 29 to create de-swirling action for minimum pressure drop.

As shown in FIGS. 2 and 3, one or more of the mid-frame cooling channels 18 include may an outlet 52 in the turbine assembly 16. The mid-frame cooling channel 18 may extend from the mid-frame torque disc 22 into one or more turbine discs 50 positioned downstream of the mid-frame torque disc 22. The outlet 52 in the turbine assembly 16 may be configured to exhaust cooling fluid into a turbine disc 50 of turbine stage two to supply a turbine assembly 16 with cooling fluid. One or more of the mid-frame cooling channels 18 may also include an outlet section 54 in communication with the outlet 52 of the cooling system 10. The outlet section 54 may be position immediately upstream from the outlet 52. The outlet section 54 may be nonparallel and nonorthogonal to a longitudinal axis 48 of the turbine engine 12. The outlet section 54 may be positioned against the rotating direction to create de-swirling action for minimum pressure drop.

The cooling system 10 may include a thermal barrier coating 56 on a radially outer surface 58 of the mid-frame torque disc 22. The thermal barrier coating 56 on a radially outer surface 58 of the mid-frame torque disc 22 may be aligned radially outward from the mid-frame cooling channel 18. The thermal barrier coating 56 may be any appropriate thermal barrier coating already conceived or yet to be conceived. The thermal barrier coating 56 may be positioned in critical regions of the outer surface 58 of the mid-frame torque disc 22 exposed to hot air or windage heat pickup for further temperature reduction of the mid-frame torque discs 22.

Figure 7:
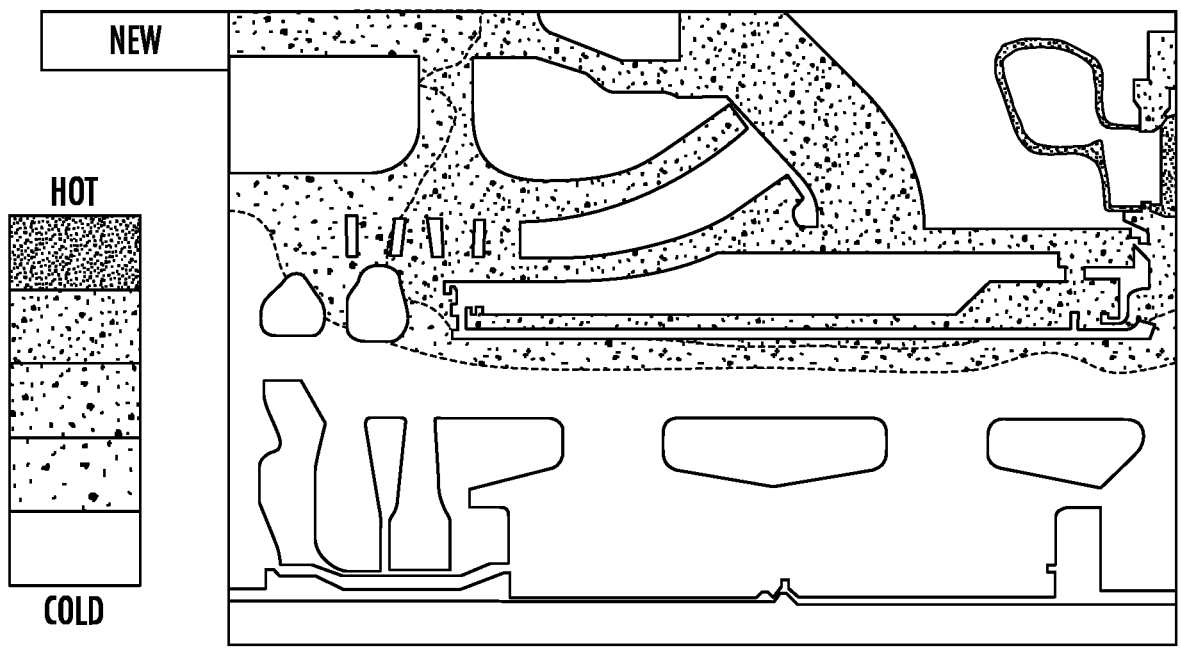
FIG. 7 is a screenshot of output from a software prediction of the material temperature within a turbine engine at steady state operating conditions with the cooling system, showing very little temperature gradient within the mid-frame torque discs and even, cool temperatures in the mid-frame torque discs.

During use, compressed air is bleed off of the compressor 14 via one or more inlets 20 in fluid communication with the compressor chamber 28. The inlet 20 may be in fluid communication with the compressor chamber 28 via direct coupled to the compressor chamber 28 or indirectly, such as in communication with the compressor chamber 28 via the cooling fluid supply bleed circuit 38. The cooling fluid, which may be, but is not limited to being, air, may enter the inlet 20 and immediately flow into the inlet section 46 which is misaligned against the rotating direction of the compressor blades 29 to create de-swirling action for minimum pressure drop. The cooling fluid then flows downstream through the mid-frame cooling channels 18, thereby cooling the hotter outer portions of the one or more mid-frame torque discs 22. The cooling fluid increases in temperature flowing through the hotter outer portions of the one or more mid-frame torque discs 22. The cooling fluid may be exhaust from the mid-frame cooling channels 18 via the outlet section 54 and the outlet 52. The cooling fluid may be exhausted into one or more turbine discs 50 positioned downstream of the mid-frame torque disc 22. The exhausted cooling fluid may be used to cool aspects of the components of the turbine assembly 16. The cooling experienced via the cooling system 10 within the mid-frame torque discs 22 is shown in FIG. 7 in contrast to the large temperature gradient within the mid-frame torque discs and high temperatures in the mid-frame torque discs 22 shown in FIG. 6.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A cooling system for a turbine engine comprising:
a compressor formed from a plurality of stages positioned within a compressor chamber, each of the plurality of stages includes a set of radially extending compressor blades; and
at least one mid-frame cooling channel extending from an inlet through at least one mid-frame torque disc positioned downstream of the compressor and upstream of a turbine assembly,
wherein the at least one mid-frame torque disc is formed from a torque disc rim positioned radially outward of a torque disc hub,
wherein the torque disc rim and the torque disc hub are separated by a torque disc web having an axially extending width that is less than both the torque disc rim and the torque disc hub,
wherein the at least one mid-frame cooling channel is positioned in the torque disc rim, and
wherein the torque disc rim forms an outer 25 percent of a radially extending length of the at least one mid-frame torque disc,
further comprising an outlet section in communication with an outlet of the cooling system, wherein the outlet section is position immediately upstream from the outlet, wherein the outlet section is nonparallel and nonorthogonal to a longitudinal axis of the turbine engine.

2. The cooling system of claim 1, further comprising at least one cooling fluid supply bleed circuit with a bleed inlet placing the at least one bleed circuit in fluid communication with the compressor chamber for receiving fluid from the compressor chamber and wherein the inlet of the at least one mid-frame cooling channel is in fluid communication with the at least one cooling fluid supply bleed circuit.

3. The cooling system of claim 1, wherein the at least one mid-frame cooling channel extends from the inlet into at least one compressor disc positioned upstream of the at least one mid-frame torque disc.

4. The cooling system of claim 1, further comprising an inlet section in communication with the inlet and immediately downstream from the inlet, wherein the inlet section is nonparallel and nonorthogonal to a longitudinal axis of the turbine engine.

5. The cooling system of claim 1, wherein the at least one mid-frame cooling channel comprises a plurality of axially extending mid-frame channels extending axially through the at least one mid-frame torque disc.

6. The cooling system of claim 5, wherein adjacent axially mid-frame extending channels are positioned equidistant from each other and wherein adjacent axially mid-frame extending channels are positioned an equal distance in a radially outward direction from a longitudinal axis of the turbine engine.

7. The cooling system of claim 1, wherein the at least one mid-frame cooling channel extends from the at least one mid-frame torque disc into at least one turbine disc positioned downstream of the at least one mid-frame torque disc, wherein the at least one mid-frame cooling channel includes at least one outlet in the turbine assembly and wherein the at least one mid-frame cooling channel is formed from a cylindrical tube.

8. The cooling system of claim 1, further comprising at least one internal rib extending from an internal surface of the at least one mid-frame cooling channel.

9. The cooling system of claim 1, further comprising a roughened surface forming an internal surface of the at least one mid-frame cooling channel.

10. The cooling system of claim 1, further comprising a thermal barrier coating on a radially outer surface of the at least one mid-frame torque disc and aligned radially outward from the at least one mid-frame cooling channel.

11. A turbine engine comprising:
a compressor;
a turbine assembly; and
a cooling system configured to cool aspects of the turbine engine between the compressor and the turbine assembly,
wherein the compressor is formed from a plurality of stages positioned within a compressor chamber, each of the plurality of stages includes a set of radially extending compressor blades,
wherein the cooling system comprises at least one mid-frame cooling channel extending from an inlet through at least one mid-frame torque disc positioned downstream of the compressor and upstream of the turbine assembly,
wherein the at least one mid-frame torque disc is formed from a torque disc rim positioned radially outward of a torque disc hub,
wherein the torque disc rim and the torque disc hub are separated by a torque disc web having an axially extending width that is less than both the torque disc rim and the torque disc hub,
wherein the at least one mid-frame cooling channel is positioned in the torque disc rim, and
wherein the torque disc rim forms an outer 25 percent of a radially extending length of the at least one mid-frame torque disc,
further comprising an outlet section in communication with an outlet of the cooling system, wherein the outlet section is position immediately upstream from the outlet, wherein the outlet section is nonparallel and nonorthogonal to a longitudinal axis of the turbine engine.

12. The turbine engine of claim 11, further comprising at least one cooling fluid supply bleed circuit with a bleed inlet placing the at least one bleed circuit in fluid communication with the compressor chamber for receiving fluid from the compressor chamber and wherein the inlet of the at least one mid-frame cooling channel is in fluid communication with the at least one cooling fluid supply bleed circuit.

13. The turbine engine of claim 11, wherein the at least one mid-frame cooling channel extends from the inlet into at least one compressor disc positioned upstream of the at least one mid-frame torque disc.

14. The turbine engine of claim 11, further comprising an inlet section in communication with the inlet and immediately downstream from the inlet, wherein the inlet section is nonparallel and nonorthogonal to a longitudinal axis of the turbine engine.

15. The turbine engine of claim 11, wherein the at least one mid-frame cooling channel comprises a plurality of axially extending mid-frame channels extending axially through the at least one mid-frame torque disc.

16. The turbine engine of claim 15, wherein adjacent axially mid-frame extending channels are positioned equidistant from each other and wherein adjacent axially mid-frame extending channels are positioned an equal distance in a radially outward direction from a longitudinal axis of the turbine engine.

17. The turbine engine of claim 11, wherein the at least one mid-frame cooling channel extends from the at least one mid-frame torque disc into at least one turbine disc positioned downstream of the at least one mid-frame torque disc, wherein the at least one mid-frame cooling channel includes at least one outlet in the turbine assembly and wherein the at least one mid-frame cooling channel is formed from a cylindrical tube.

* * * * *